(12) United States Patent
Halik

(10) Patent No.: US 12,484,475 B2
(45) Date of Patent: Dec. 2, 2025

(54) INTEGRATED TRIMMER FOR A LAWN MOWER

(71) Applicant: Aaron Halik, Moorhead, MN (US)

(72) Inventor: Aaron Halik, Moorhead, MN (US)

( * ) Notice: Subject to any disclaimer, the term of this patent is extended or adjusted under 35 U.S.C. 154(b) by 905 days.

(21) Appl. No.: 17/682,344

(22) Filed: Feb. 28, 2022

(65) Prior Publication Data

US 2022/0287230 A1    Sep. 15, 2022

Related U.S. Application Data

(60) Provisional application No. 63/159,373, filed on Mar. 10, 2021.

(51) Int. Cl.
| | |
|---|---|
| *A01D 34/416* | (2006.01) |
| *A01D 34/84* | (2006.01) |
| *A01D 69/02* | (2006.01) |
| *A01D 101/00* | (2006.01) |

(52) U.S. Cl.
CPC ..... *A01D 34/4165* (2013.01); *A01D 34/4167* (2013.01); *A01D 34/84* (2013.01); *A01D 69/02* (2013.01); *A01D 2101/00* (2013.01)

(58) Field of Classification Search
CPC ........... A01D 34/4165; A01D 34/4167; A01D 34/84; A01D 34/416; A01D 34/82; A01D 43/16; A01D 69/02; A01D 69/025
See application file for complete search history.

(56) References Cited

U.S. PATENT DOCUMENTS

| | | | |
|---|---|---|---|
| 4,642,976 A * | 2/1987 | Owens | A01D 43/16 56/11.8 |
| 4,718,221 A | 1/1988 | Wessel | |
| 4,852,658 A * | 8/1989 | Wessel | A01D 43/16 172/14 |
| 4,854,115 A | 8/1989 | Jones | |
| 5,966,914 A | 10/1999 | Reents | |
| 6,094,896 A | 8/2000 | Lane | |
| 6,397,572 B1 * | 6/2002 | Roundy | A01D 43/16 56/13.7 |
| 7,165,383 B1 | 1/2007 | Luton, Jr. | |
| 7,398,637 B1 * | 7/2008 | Sevey | A01D 34/84 56/14.9 |
| 8,001,752 B1 * | 8/2011 | Lin | A01D 43/16 56/12.7 |
| 8,046,980 B1 | 11/2011 | Schroeck | |
| 8,464,504 B1 * | 6/2013 | Huff | A01D 43/16 56/13.7 |
| 9,386,740 B2 | 7/2016 | Miller | |
| 2004/0237491 A1 * | 12/2004 | Heighton | A01D 34/416 56/12.7 |
| 2010/0326031 A1 | 12/2010 | Branden | |

* cited by examiner

*Primary Examiner* — Joseph M Rocca
*Assistant Examiner* — Robert E Pezzuto
(74) *Attorney, Agent, or Firm* — Fargo Patent & Business Law; Thomas Kading; Joshua Krank

(57) ABSTRACT

An integrated trimmer device for a lawnmower includes a coupler securable to an axle wheel of the lawnmower along a longitudinal axis of a bolt, the coupler comprises a gear system; a mounting bracket secured to the coupler; and a trimmer mount secured to the mounting bracket by the bolt at a desired rotational position defined by the gear system.

3 Claims, 12 Drawing Sheets

INTEGRATED TRIMMER FOR A LAWN MOWER

CROSS-REFERENCE TO RELATED APPLICATION(S)

This application claims the priority and benefit to U.S. Provisional Patent Application No. 63/159,373 filed: Mar. 10, 2021, the contents of which are hereby incorporated by reference in its entirety.

BACKGROUND

Lawn maintenance often includes the act of mowing grass using a lawnmower and trimming grass in areas the lawnmower may not fully access. For example, trimmers are used along fences, around trees, near edging, and many other areas. Often, the grass that needs to be trimmed is immediately adjacent to the grass being mowed by a lawnmower, yet unable to be fully cut by the lawnmower itself.

Trimmers typically have a string like mechanical feature which is quickly rotated to cut the pieces of grass. Fine adjustments are commonly needed to position a trimmer such that the grass being cut is properly cut to the desired length. There is an ongoing desire by those in the art to increase the efficiency of mowing and trimming activities. Combining the two activities into one task helps provide for such need.

SUMMARY

The present application discloses an integrated trimmer device that is attached to the existing wheel fixture of a lawnmower. The integrated trimmer device may be used as a string trimmer or as a lawn edger.

An exemplary integrated trimmer device comprises a mounting bracket, a housing, a motor, a trimmer head, and a battery. The mounting bracket allows for the integrated trimmer device to be attached to a lawnmower. A collar shaft may connect the mounting bracket to the housing. The housing may contain the motor which is connected to a trimmer head, An operator may control the trimmer head to trim or edge landscaping immediately adjacent to the lawnmower. The mounting bracket may be configured to attach to an axle on the lawnmower,

BRIEF DESCRIPTION OF THE DRAWINGS

These and other features and advantages of the present invention will become more readily appreciated as the same becomes better understood by reference to the following detailed description when considered in connection with accompanying drawings, wherein.

DETAILED DESCRIPTION OF THE ILLUSTRATED EMBODIMENTS

General

The present invention will now be described with occasional reference to the specific embodiments of the invention. However, this invention may be embodied in different forms and should not be construed as limited to the embodiments set forth herein. Rather, these embodiments are provided so that this disclosure will be thorough and complete and fully convey the invention's scope to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to limit the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth, as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention, Notwithstanding that the numerical ranges and parameters setting forth the broad scope of the invention are approximations, the numerical values set forth in the specific examples are reported as precisely as possible. However, any numerical values inherently contain certain errors necessarily resulting from error found in their respective measurements.

Figures Detail

Figure 1:
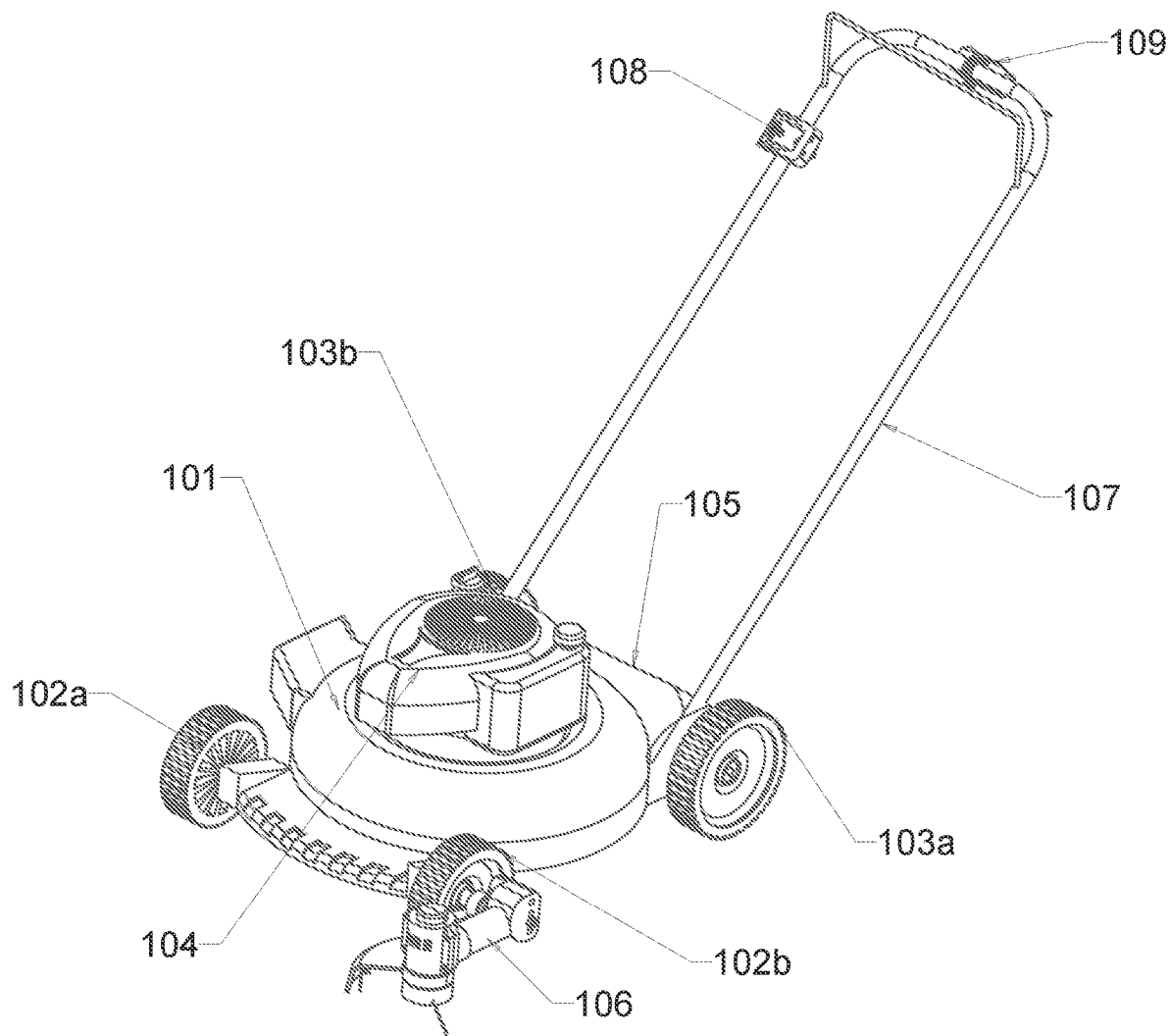
FIG. 1 shows a perspective view of a lawnmower with an integrated trimmer.

FIG. 1, a lawnmower 101 is shown with four wheels including a front left wheel 102*b*, a front right wheel 102*a*, a back left wheel 103*a*, and a back right wheel 103*b*. In this sample, a combustion engine 104 is mounted on a mower deck 105. The combustion engine 104 is the power plant that drives the lawnmower's cutting function. Any type of power plant may be used to power the lawnmower functions. For example, an electric power plant may be substituted for the combustion engine 104. In some lawnmower variations, a mechanical function is used to propel the lawnmower forward. In the example in FIG. 1, an integrated trimmer device 106 is mounted to the front left wheel 102*b*. The integrated trimmer device 106 may also be installed on the front right wheel 102a or either of the back wheels 103.

The lawnmower 101 in FIG. 1 has a handle 107 attached to the mower deck 105 and attached to the handle 107 is attached a battery mount 108 and an electrical switch 109 for controlling the integrated trimmer device 106. The battery mount 108 may be placed at any position on the handle 107, may be mounted to the mower deck 105, mounted to the integrated trimmer device 106, or mounted to the lawnmower power plant. A battery is placed into the battery mount 108 for operation of the integrated trimmer device 106. The battery is electrically connected to the battery mount 108 which is electrically connected to the electrical switch 109 which is electrically connected to the integrated trimmer device 106. Alternatively, the battery is electrically connected to an electrical switch 109 and the electrical switch 109 is electrically connected to the motor 303. Wiring can be routed through channels and hidden areas in the lawnmower 101 or may be secured to various elements of the lawnmower 101. The electrical switch 109 may be controlled by a sensor or computer program. For example, a sensor may be configured to detect the distance between the mower deck 105 and an adjacent structure; if the distance meets a certain metric, the electrical switch 109 could be activated such that electric energy is delivered to the motor 301 The sensor may be electrically connected to the electrical switch 109 and the electrical switch 109 may be activated by input from the sensor.

An integrated trimmer device may be mounted to any variation of a lawnmower including but not limited to a push lawnmower, a riding lawnmower, and any other variation of lawnmower.

In the event the power plant on the lawnmower is electric, the power plant and the integrated trimmer device may be powered from the same battery.

Figure 2:
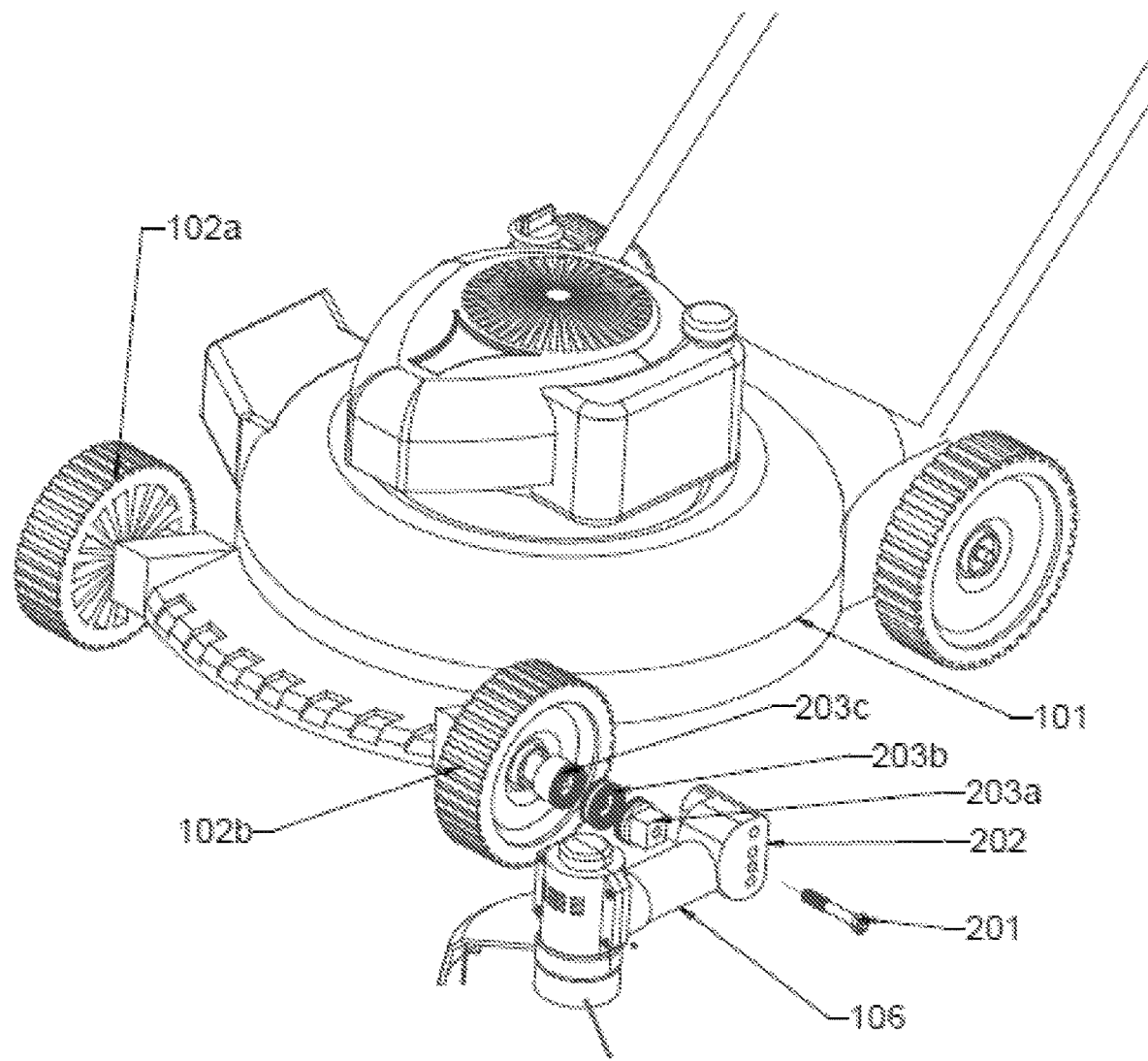
FIG. 2 shows an example of one manner in which an integrated trimmer is mounted to a mower.

FIG. 2, an integrated trimmer device 106 is shown mounted to a lawnmower 101 on a front left wheel 102b. In this embodiment, a three-piece toothed index system 203 is used to connect the integrated trimmer device 106 to the front left wheel 102b. Alternatively, the integrated trimmer device 106 may also be mounted to the front right wheel 102a. The three-piece toothed index system 203 is comprised of a fixed gear coupler 203c, a gear spacer 203b, and a trimmer mount 203a. The fixed gear coupler 203c is attached to the front left wheel 102b such that the physical connection is specifically secured to the wheel's axle. Depending on the specific lawnmower variation, the fixed gear coupler 203c is secured to the axle using different methods. If the axle is threaded, the fixed gear coupler 203c may be connected using the requisite thread. If the axle is a piece with no thread, the fixed gear coupler 203c may be connected using a friction fit nut, a clamp, or other manner commonly understood by a person of ordinary skill in the art. A bolt 201 is placed through a mounting bracket 202, through the trimmer mount 203a, through the gear spacer 203b, and threaded into the fixed gear coupler 203c. The bolt 201 has a longitudinal axis. The longitudinal axis may be the central line through the bolt 201.

The term "axle" as used herein is considered to include the various fixtures and devices used to connect a wheel to a lawnmower deck. An axle may represent a bolt extending from a lawnmower deck, a shaft extending through the mower deck, or other variation common to a person in the art. For example, a front axle may connect a front wheel 102 to the lawnmower 101.

The fixed gear coupler 203c is connected to the gear spacer 203b such that both the fixed gear coupler 203c and the gear spacer 203b have teeth that interface together. When the bolt 201 is screwed into the fixed gear coupler 203c, the fixed gear coupler 203c and the gear spacer 203b are secured tightly together such that the two pieces cannot rotate axially. When the bolt 201 is loose or removed, the pieces can rotate axially. The gear spacer 203b is connected to the trimmer mount 203a such that both the gear spacer 203b and the trimmer mount 203a have teeth that interface together. When the bolt 201 is screwed into the fixed gear coupler 203c, the gear spacer 203b and the trimmer mount 203a are secured tightly together such that the two pieces cannot rotate axially. When the bolt 201 is loose or removed, the pieces can rotate axially.

The trimmer mount 203a is secured to the mounting bracket 202 when the bolt 201 is tightened. The square shape shown on the trimmer mount 203a is shaped to match a hole on the mounting bracket 202 such that when the bolt 201 is tightened the trimmer mount 203a is snuggly fitted into the corresponding hole on the mounting bracket 202. Any shape with which will be prohibited from moving when snuggly secured in a hole shaped to match, may be utilized on the trimmer mount 203a.

The teeth located on the fixed gear coupler 203c, the gear spacer 203b, and the trimmer mount 203a may vary in size and shape. The teeth as shown in FIG. 2, allow that the integrated trimmer device 106 may be rotated axially in increments of 2.5 degrees.

Figure 3:
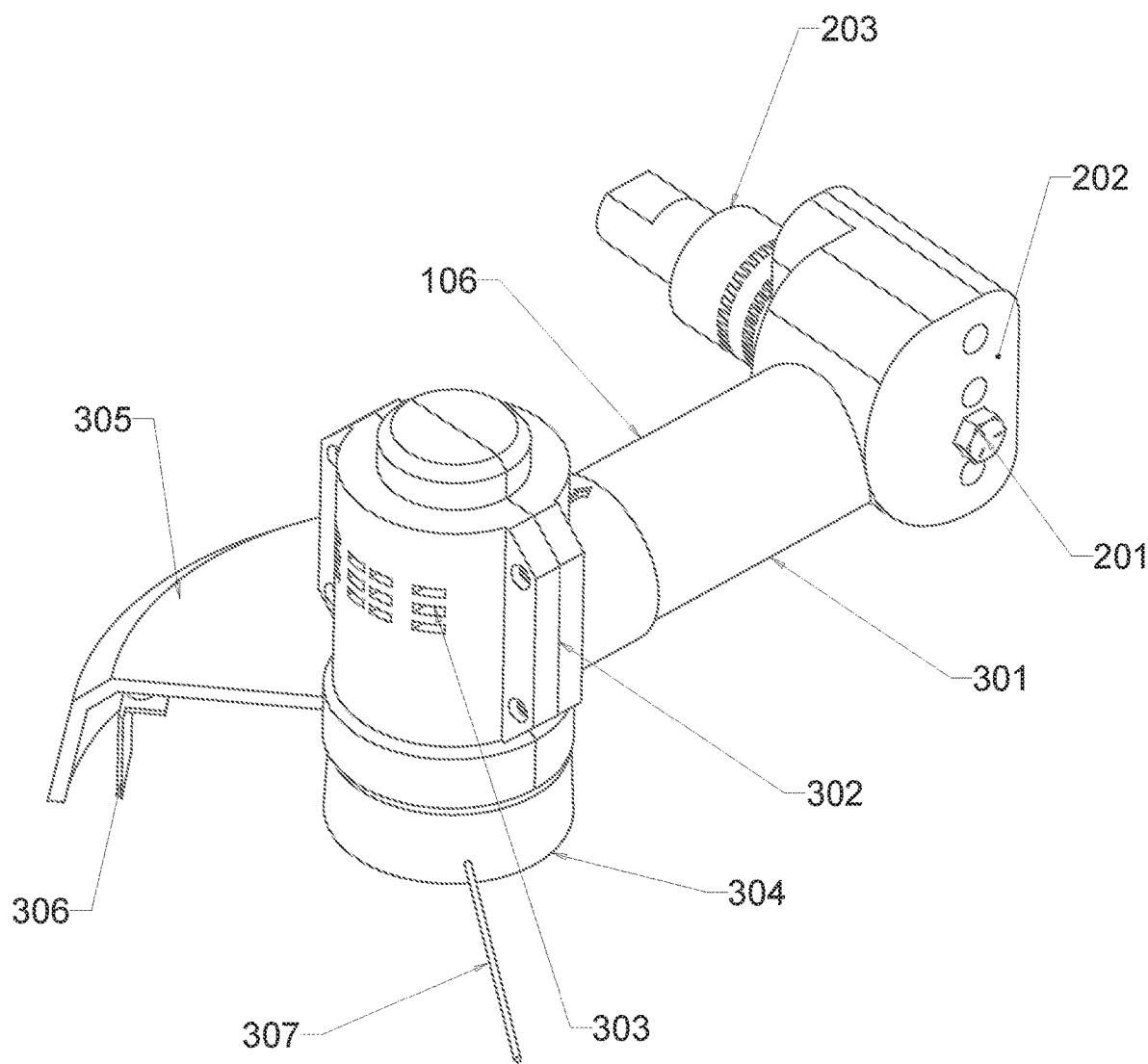
FIG. 3 shows a perspective of an integrated trimmer device.

FIG. 3, an integrated trimmer device 106 is shown. The integrated trimmer device 106 in this example is comprised of a three-piece toothed index system 203, a mounting bracket 202, a collar shaft 301, a housing 302, a motor 303 secured within the housing 302, and a trimmer head 304. The example also shows the use of a trimmer guard 305 and an automatic line knife 306. In the event of trimmer line 307 becomes too long, the automatic line knife 306 cuts the excess trimmer line. The trimmer head 304 shown in FIG. 3 is a line type which utilizes two trimmer lines 307. Any trimmer head commonly used by those of ordinary skill in the art may be substituted. Such trimmer heads may include rounded heads, any number of trimmer lines, solid heads, fixed string, automatic string, and any other types.

The three-piece toothed index system 203 is fit to the mounting bracket 202 utilizing a corresponding shape on the trimmer mount and the mounting bracket 202. A bolt 201 is inserted through the mounting bracket 202 into the three-piece toothed index system 203 to securely hold the mounting bracket 202 to the three-piece toothed index system 203.

The collar shaft 301 is connected to the housing 302. The housing 302 contains a motor 303 which is connected to the trimmer head 304. The trimmer guard 305 is connected to the housing 302. The trimmer guard 305 may be mounted at various locations in relation to the housing 302 based on the side which is desired to be protected from the trimmer head 304 and the trimmer lines 307. While in operation the trimmer guard 305 is secured in place. Attached to the trimmer guard 305 at a fixed distance is the automatic line knife 306. The automatic line knife 306 is positioned such to cut any excess trimmer lines 307 that exceed the fixed distance.

Figure 4:
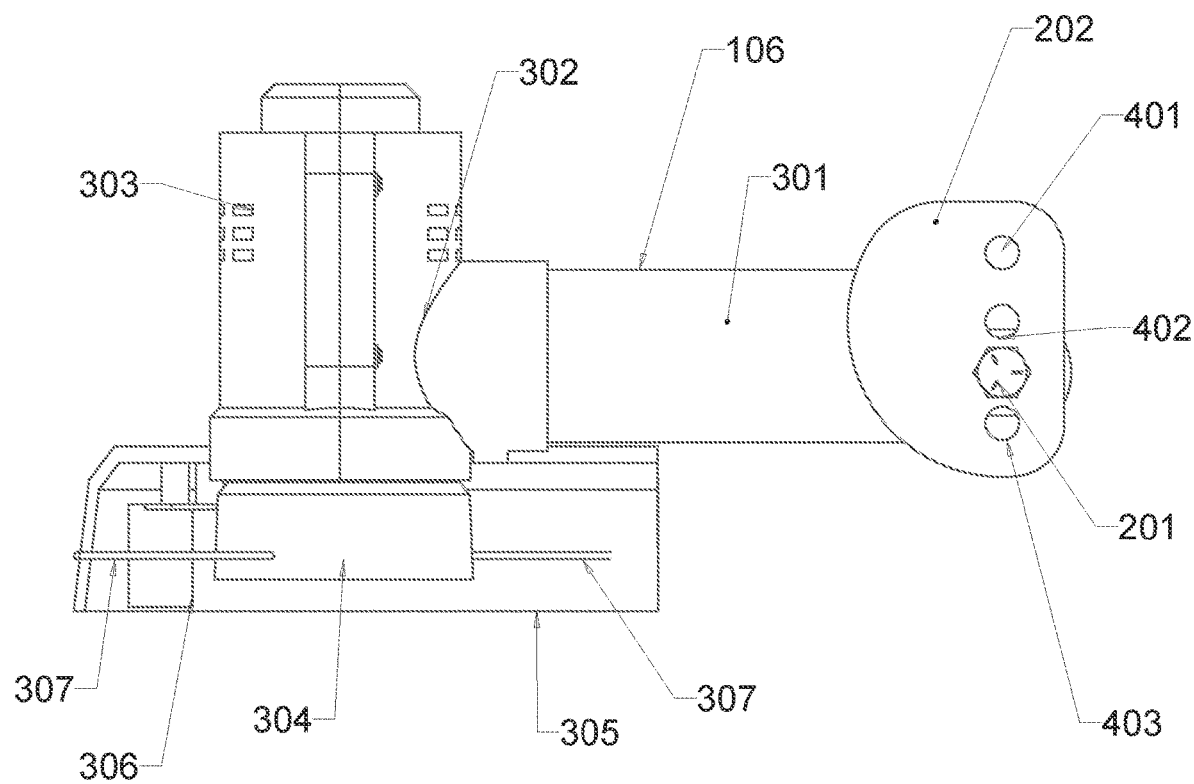
FIG. 4 shows a side perspective of an integrated trimmer device.

FIG. 4, an integrated trimmer device 106 is shown from a side perspective. Shown is an integrated trimmer device 106 which is comprised of a mounting bracket 202, a collar shaft 301, a housing 302, a motor 303 secured within the housing 302, and a trimmer head 304. The example also shows the use of a trimmer guard 305, a set of trimmer lines 307, and an automatic line knife 306. In this example there are four holes in the mounting bracket 202 through which the bolt 201 can be inserted. A first hole 401 is located in the uppermost position of the mounting bracket 202. When the integrated trimmer device 106 is installed using the first hole 401, the trimmer head 304 is located closest to the ground. A second hole 402 is located below the first hole 401. A third hole in this example is filled with the bolt 201. A fourth hole 403 is located at the lowest portion of the mounting bracket 202. In alternative embodiments, more or less than four holes may be utilized. The height of the trimmer head 304 off the ground increases as the bolt 201 is placed in holes lower on the mounting bracket 202. Further, alternative embodiments may employ any system to move the trimmer head 304 closer or further from the ground. Any system understood by a person of ordinary skill in the art may be used for such function.

Figure 5:
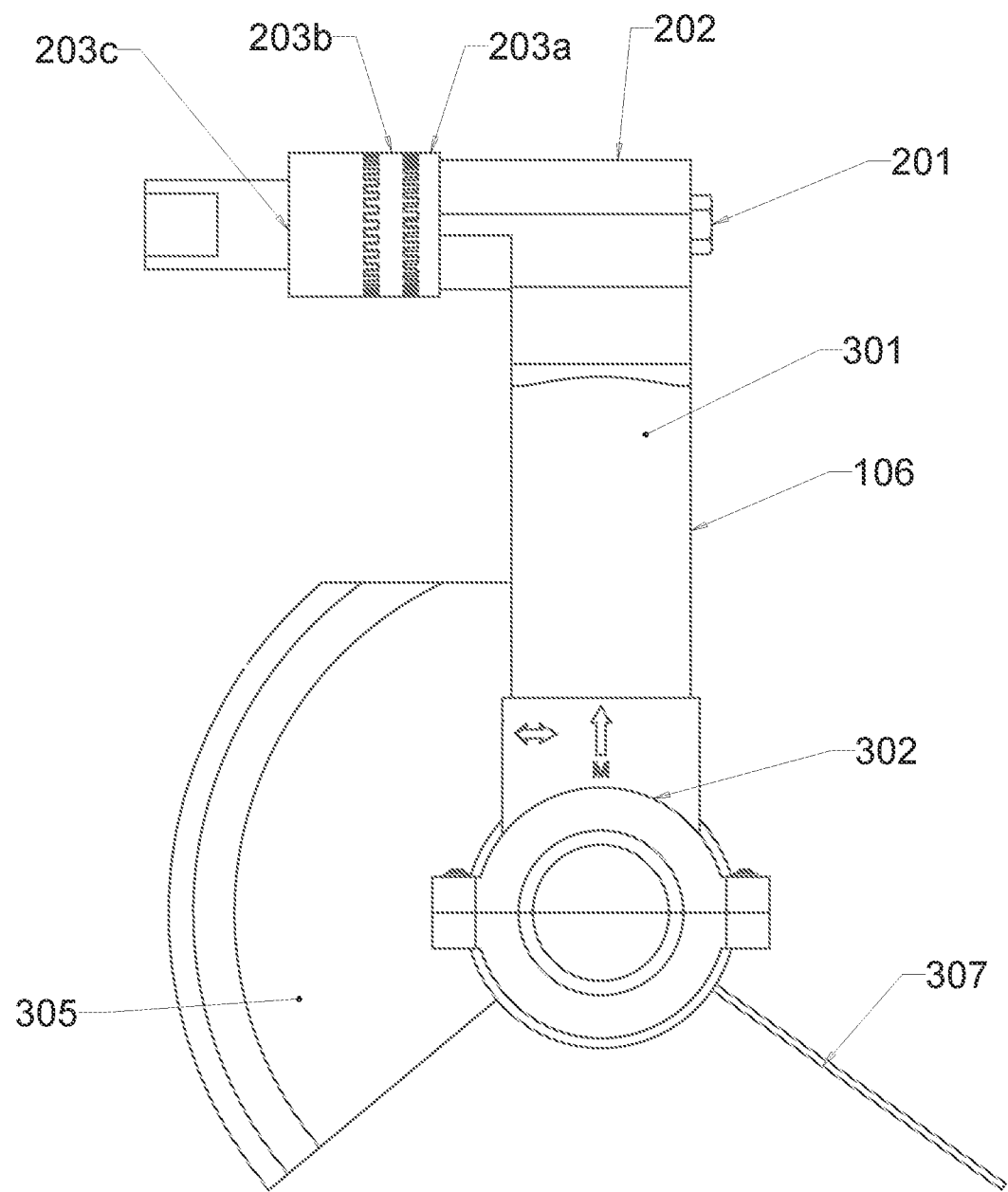
FIG. 5 shows a top perspective of an integrated trimmer device.

FIG. 5, an integrated trimmer device 106 is shown from a top perspective. Shown is an integrated trimmer device 106 which is comprised of a mounting bracket 202, a collar shaft 301, a housing 302, a motor secured within the housing 302, a three-piece toothed index system 203 and a trimmer head. The example also shows the use of a trimmer guard 305, a trimmer line 307, and an automatic line knife. The three-piece toothed index system 203 is comprised of a fixed gear coupler 203c, a gear spacer 203b, and a trimmer mount 203a. A bolt 201 is inserted through the mounting bracket 202, through the trimmer mount 203a, through the gear spacer 203b, and threaded into the fixed gear coupler 203c. When the bolt 201 is loosened or unthreaded, the mounting bracket 202, the trimmer mount 203a, the gear spacer 203b, and the fixed gear coupler 203c can be physically separated simply by pulling apart.

Figure 6:
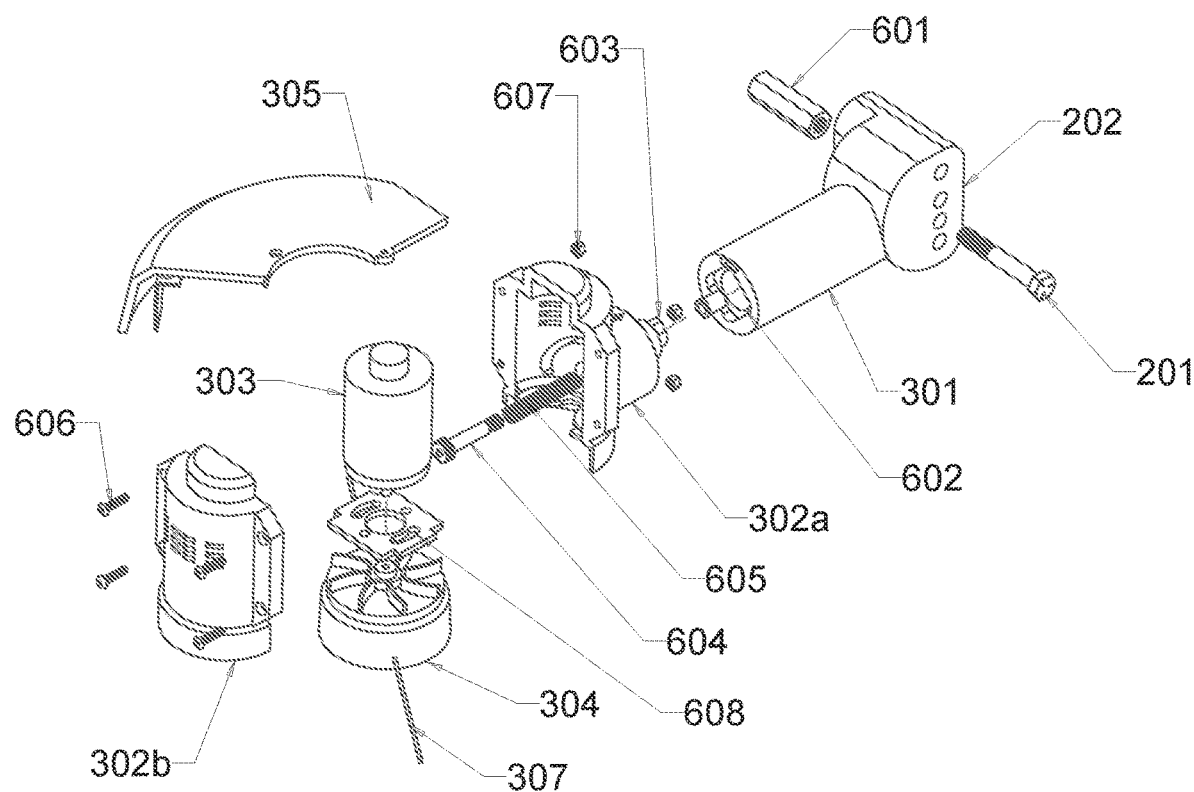
FIG. 6 shows an exploded view of an integrated trimmer device using a variation for mounting using a bolt and a coupling nut.

FIG. 6, an integrated trimmer device 106 is shown in an exploded view. In this embodiment a coupling nut 601 is used to connect the integrated trimmer device 106 to a mower wheel. The coupling nut 601 is attached to the mower wheel such that the physical connection is specifically secured to the wheel's axle. Depending on the specific lawnmower variation, the coupling nut 601 is secured to the axle using different methods. If the axle is threaded, the coupling nut 601 may be connected using the requisite thread. If the axle is a piece with no thread, a different mounting strategy can be used to connect to a friction fit nut, a clamp, or other manner commonly understood by a person of ordinary skill in the art. A bolt 201 is inserted through the mounting bracket 202 and threaded into the coupling nut 601.

In FIG. 6, the collar shaft 301 is shown to have a recessed notch 602 where an inner housing 302a rotation key 603 fits. The recessed notch 602 and the inner housing 302a are mated such that when the inner housing 302a is fit into the recessed notch 602, the housing 302 cannot rotate axially on the collar shaft 301. A threaded fastener 604 is inserted through a spring 605, through the inner housing 302a, and threaded into matched threads within the collar shaft 301. A gap between the flange of the threaded fastener 604 and the inner housing 302a is filled by the spring 605. The spring 605 has enough force to secure the inner housing 302a and the collar shaft 301 snuggly together such that without additional force, the two pieces are unable to move apart. An operator may apply force pulling the inner housing 302a and the collar shaft 301 apart such that the inner housing 302a is removed from the recessed notch 602. When such removal has occurred, the housing 302 may rotate in relation to the collar shaft 301. Upon rotating ninety degrees the pressure may be released, and the spring 605 will pull the housing 302 back snug with the collar shaft 301 such that the inner housing 302a is reinserted into the recessed notch 602.

The housing 302 rotates for the purpose of using the integrated trimmer device 106 either to trim grass as one would traditionally trim with a string trimmer; or edge a lawn as one would traditionally edge with a lawn edger. The rotating function allows the trimmer head 304 to rotate on a plane perpendicular to the lawnmower 101 wheels or on a plane parallel with the lawnmower 101 wheels. When the trimmer head 304 rotation plane is parallel with the wheel plane, the integrated trimmer device 106 is used as a device to perform the function of a lawn edger. When the trimmer head 304 rotation plane is perpendicular with the wheel plane, the integrated trimmer device 106 is used as a device to perform the function of a string trimmer.

The housing 302 is comprised of the inner housing 302a and an outer housing 302b. The inner housing 302a and the outer housing 302b in this example is secured together using a set of screws 606 and nuts 607. Multiples screws and nuts may be used to secure the housing 302 together. Other fastener types common to a person of ordinary skill in the art for securing the housing together. Within the housing 302 a motor 303 is located. In this example, the motor 303 is connected to the trimmer head 304. A mounting plate 608 in this example is located between the trimmer head 304 and the motor 303. In some embodiments, the mounting plate 608 may be removed or substituted such that the housing 302 can secure the motor 303 in place. A trimmer guard 305 is connected to the housing 302. The trimmer head 304 is connected in this example to two trimmer lines 307.

Alternatively, the collar shaft 301 and the inner housing 302a may be permanently fixed together wherein such embodiment would allow for only one type of operation. The inner housing 302a and the outer housing 302b may be permanently fixed or sealed together rather than using fasteners.

Figure 7:
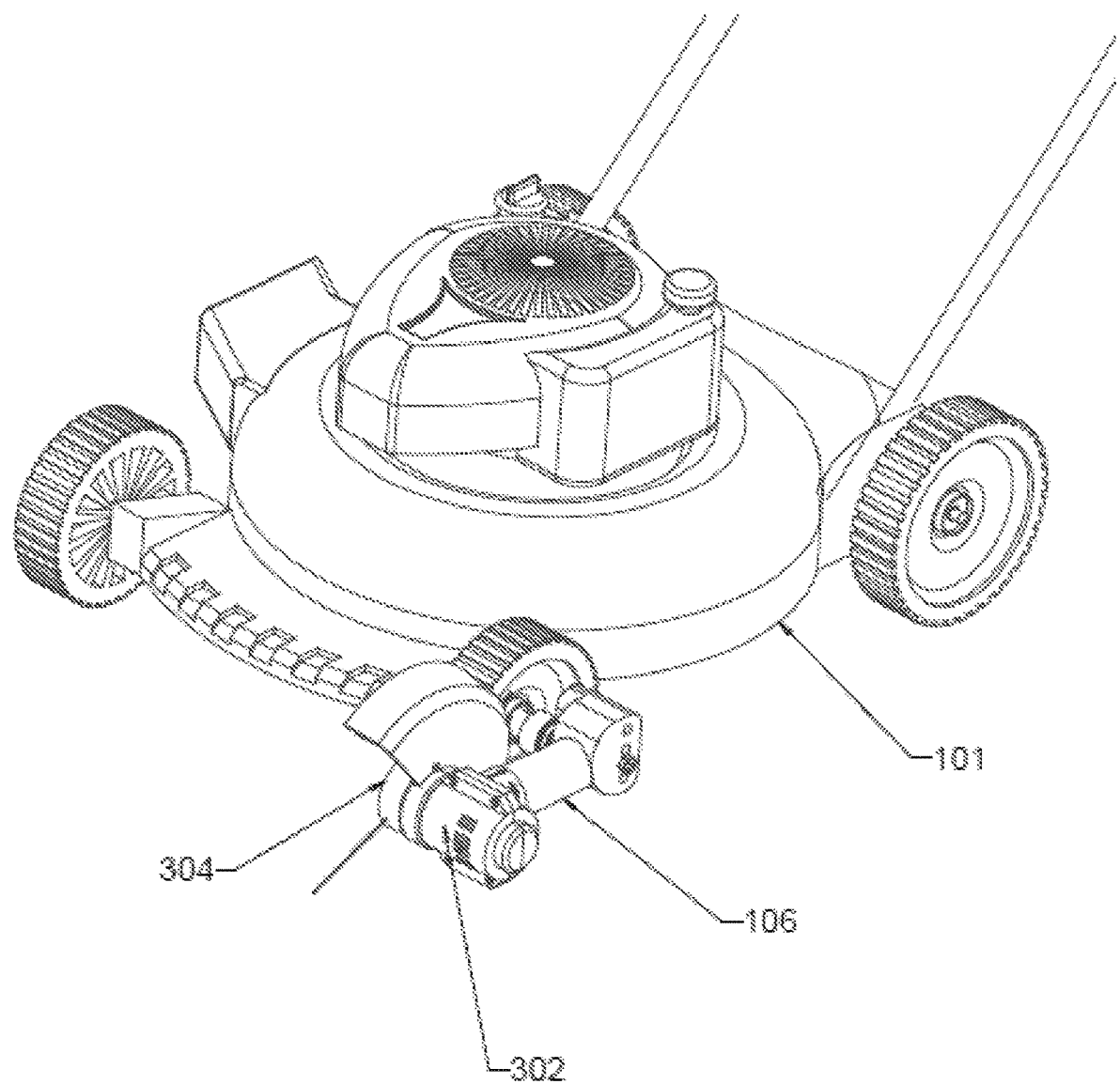
FIG. 7 shows an integrated trimmer device used as a lawn edger.

FIG. 7, a lawnmower 101 is shown with an integrated trimmer device 106 such that the integrated trimmer device 106 has a housing 302 rotated such that the trimmer head 304 rotation plane is parallel with the wheel plane and the integrated trimmer device 106 is used as a device to perform the function of a lawn edger. A lawn edger is commonly referred to as a lawn edger, weed edger, edger, or other such terms.

Figure 8:
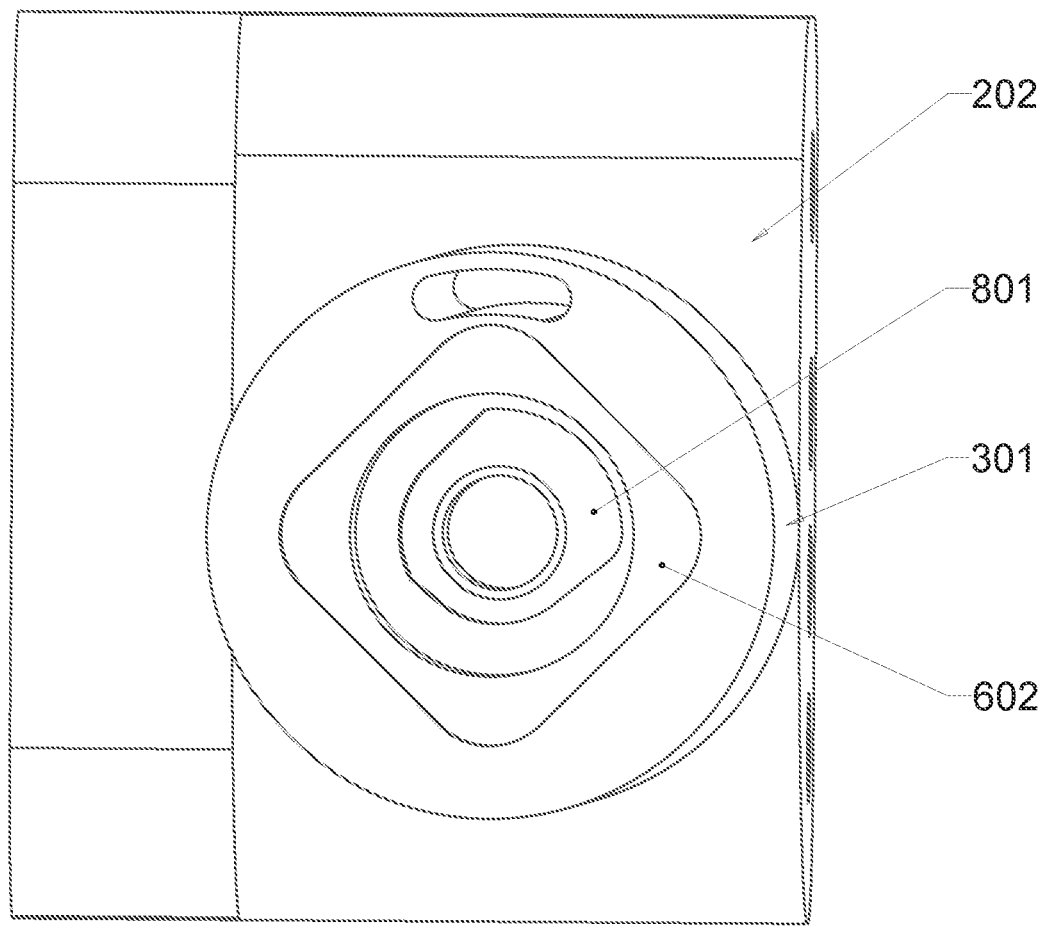
FIG. 8 shows the inner portion of the collar shaft.

FIG. 8, a mounting bracket 202 and collar shaft 301 is shown. Within the collar shaft 301 is a recessed notch 602 and a rotation slot 801. Within the rotation slot 801 the rotation key sits such that the rotation slot 801 constrains the rotation key from rotating more than 90 degrees. The rotation key and rotation slot may be shaped in any such way that constrains the rotation to the desired degrees.

Figure 9:
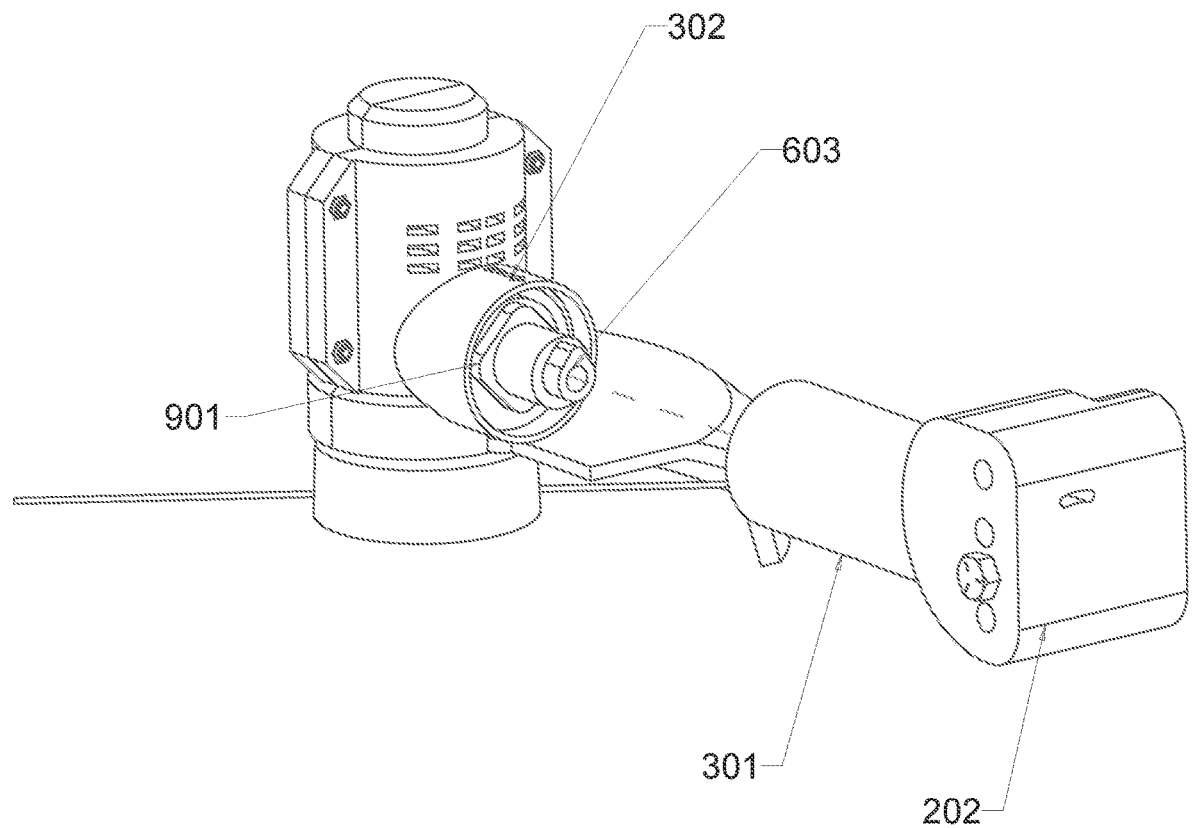
FIG. 9 shows the exploded view which reflects a rotation key.

FIG. 9, an exploded view of a housing 302, a collar shaft 301, and a mounting bracket 202 are shown. The rotation key 603 is shown in a lobe like shape that fits into a rotation slot. A portion of the housing 302 is shown in this example as an extruded box 901 such that it is consistent in shape with the recessed notch. Any shaped recessed notch and any shape extruded box 901 can be used as long as the fitting does not allow rotation when the extruded box is inserted in the recessed notch. For example triangles, pentagons, ovals, and other shapes a person with ordinary skill in the art would use, are all applicable.

Figure 10:
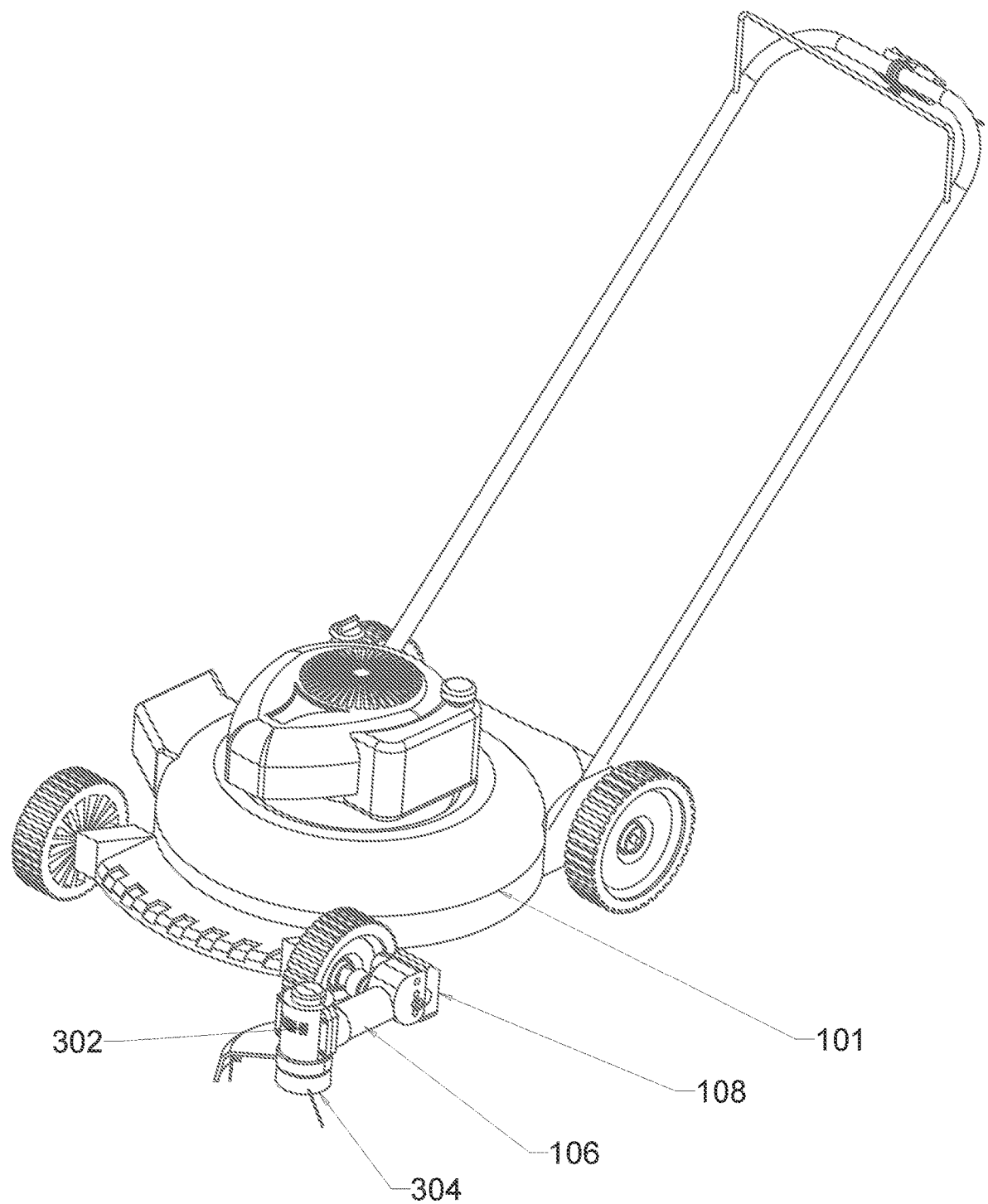
FIG. 10 shows an integrated trimmer device used as a string trimmer as well as a battery mounted to the integrated trimmer device.

FIG. 10, a lawnmower 101 is shown with an integrated trimmer device 106 such that the integrated trimmer device 106 has a housing 302 rotated such that the trimmer head 304 rotation plane is perpendicular with the wheel plane and the integrated trimmer device 106 is used as a device to perform the function of a string trimmer. In this example, a battery mount 108 is connected to the integrated trimmer device 106. A battery may be connected to the battery mount 108. The battery may be permanently installed such that it is charged while mounted, or may be released from the battery mount 108. A string trimmer is commonly referred to as a weed trimmer, weed wacker, string trimmer, line trimmer, weed whip, or other such terms.

The wheel plane is generally parallel with the direction of travel of the lawnmower 101. A wheel often rotates around an axle wherein the wheel rotates around the axis of the axle. The wheel plane is perpendicular to the axis of the axle. A plane that is perpendicular to the wheel plane is generally parallel with the ground. A plane that is parallel to the wheel plane is generally perpendicular with the ground.

Figure 11:
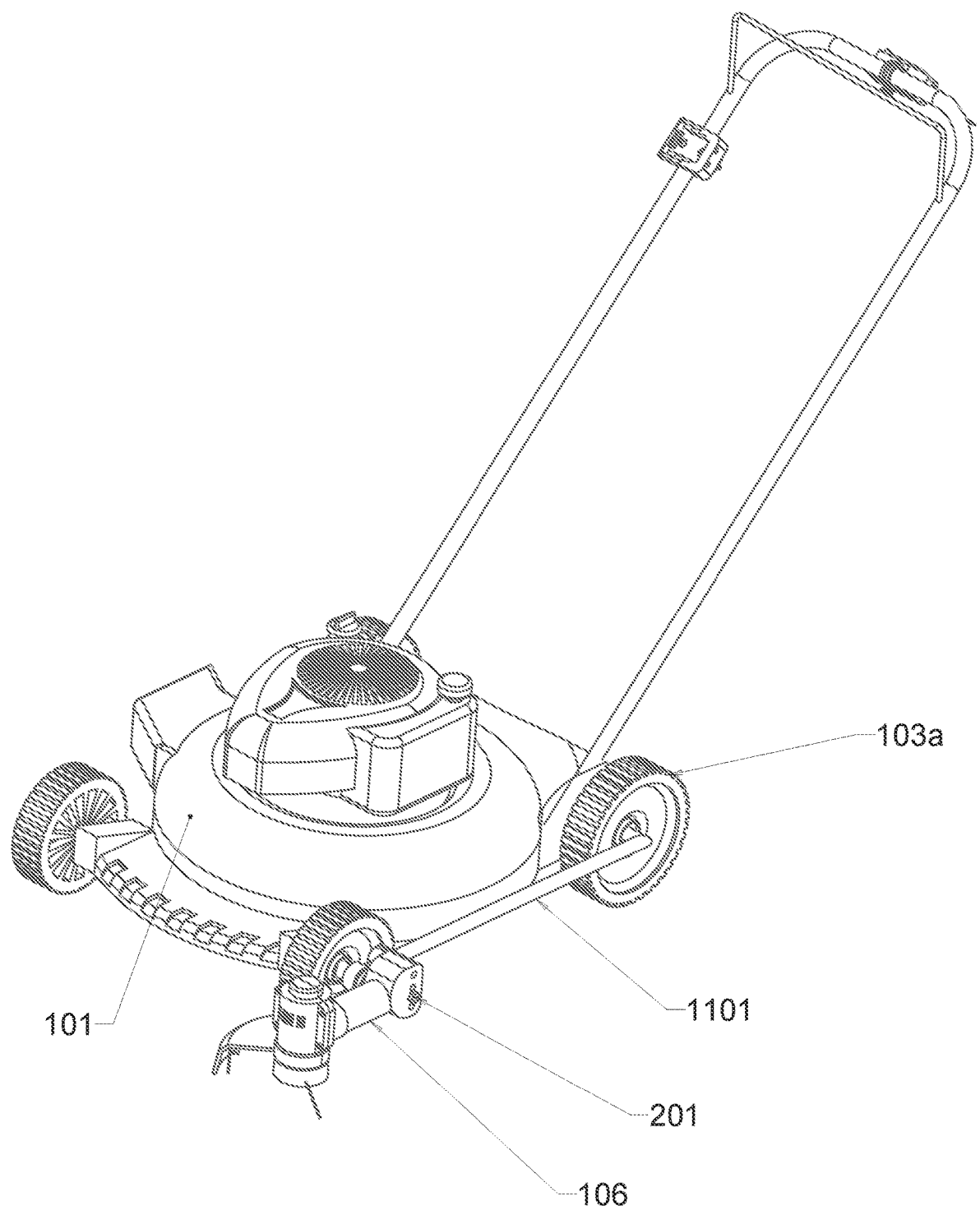
FIG. 11 shows an integrated trimmer device with a reinforcement arm.

FIG. 11, a lawnmower 101 is shown with an integrated trimmer device 106. This example includes a reinforcement arm 1101 that is connected to the integrated trimmer device 106 on one end and to the axle of the back left wheel 103a. This reinforcement arm 1101 helps stabilize the integrated trimmer device 106 from vibrations and unwanted movement. The bolt 201 may be substituted with any similar type of fastener understood by a person of ordinary skill in the art. Alternatively, the reinforcement arm may connect to both the front and back wheel with the integrated trimmer device being secured to the reinforcement arm itself.

Figure 12:
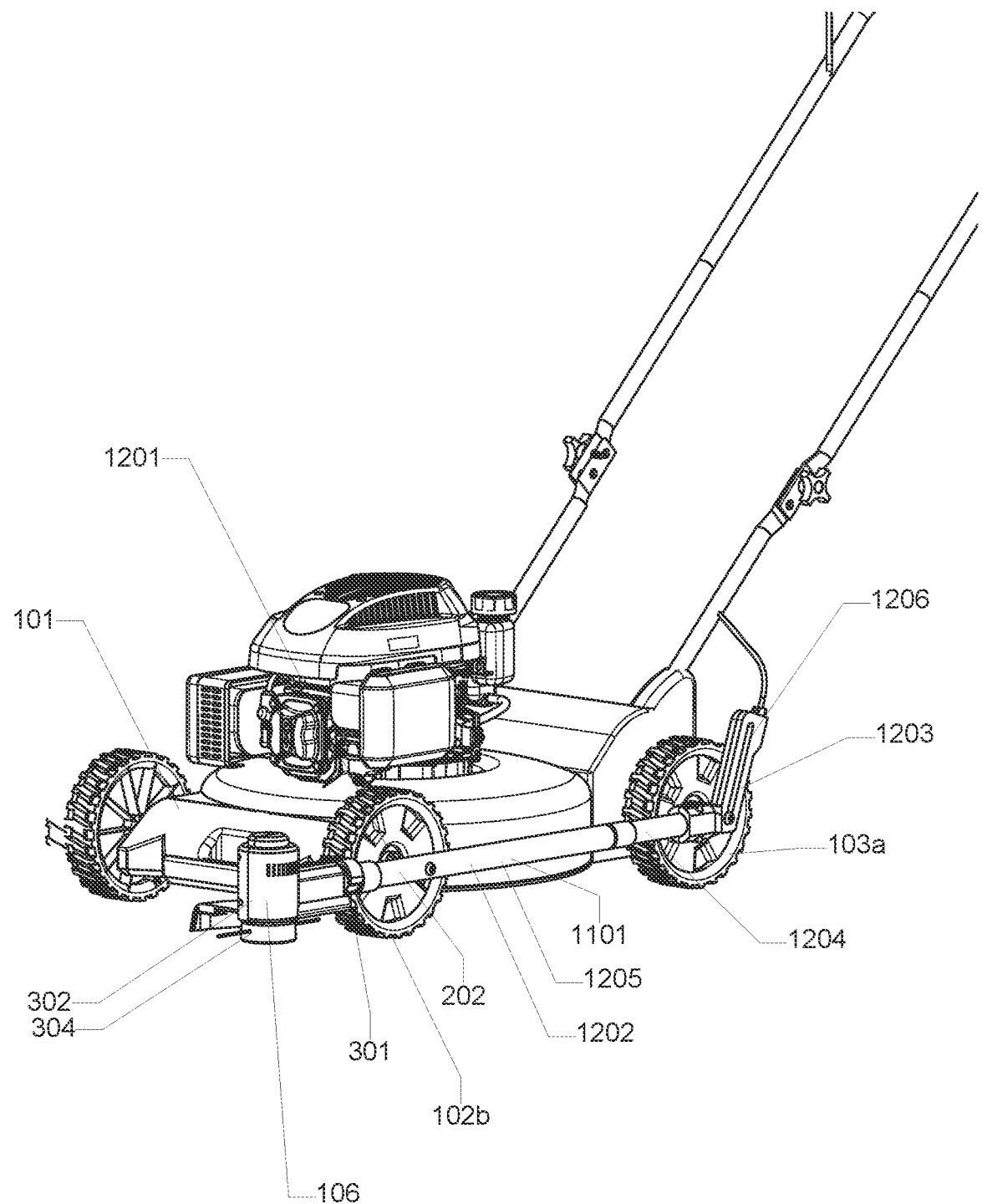
FIG. 12 shows an embodiment of the integrated trimmer device.

FIG. 12 shows an embodiment of the integrated trimmer device 106. The embodiment shown in FIG. 12 comprises a mounting bracket 202, a housing 302, a motor 303, a trimmer head 304, a battery, and a reinforcement arm 1101. The mounting bracket 202 as shown in this embodiment is configured such that the mounting bracket 202 extends from the collar shaft 301 which connects the mounting bracket 202 to the housing 302. The mounting bracket 202 may extend from the collar shaft 301 to a coupler 1201 attached to the axle of the front left wheel 102b. The mounting bracket 202 is configured to connect to the coupler 1201.

The mounting bracket 202 is connected to the collar shaft 301. The mounting bracket 202 may be connected to the collar shaft 301 using fasteners, welds, friction interface, or may be manufactured in one solid object. For example, the mounting bracket 202 and the collar shaft 301 may be comprised of a plastic material that was manufactured by using a mold that molds the mounting bracket 202 and collar shaft 301 as one plastic piece. The material could alternatively be a metal, a composite, fiberglass, or any other appropriate material. Similarly, the motor 303 and the housing 302 may be integrated into one solid object. For example, the housing 302 may serve as part of the mechanical structure of the motor 303.

As shown in FIG. 12, the mounting bracket 202 is comprised of a hole that extends through a pipe-shaped structure that becomes the reinforcement arm 1101. The coupler 1201 may extend through the hole and a fastener may secure the mounting bracket 202 to the coupler 1201. The pipe-shaped structure may continue extending toward the back left wheel 103a and become the reinforcement arm 1101.

A coupler 1201 may be any device that connects an axle on a mower wheel to a mounting bracket 202. A coupler 1201 may include but is not limited to a three-piece gear system 203, a coupling nut 601, or other similar devices. Further, the coupler 1201 may comprise of a shaft extending through the mounting bracket 202, may attach to the exterior of the mounting bracket 202, or may attach in any other manner. The coupler 1201 may alternatively be secured to the mower deck 105. The coupler 1201 may be secured to the lawnmower by the coupler 1201 being secured to the mower deck 105 or any of the wheel axles. A coupler 1201 may be secured to the mower deck 105 using fasteners, welds, friction interface, or may be manufactured as an integrated element of the mower deck 105.

The reinforcement arm 1101 may comprise a tube assembly 1202. The tube assembly 1202 may comprise of a rear adjustment bracket 1203, a rear tube 1204, and a front tube 1205. The rear adjustment bracket 1203 is secured to a rear axle. As shown in FIG. 12, the rear axle is the axle for the back left wheel 103a. The rear adjustment bracket 1203 may comprise a slotted bracket 1206 wherein the rear adjustment bracket 1203 is secured to the rear axle on the slotted bracket 1206. The slotted bracket 1206 may comprise of a slot extending along the slotted bracket 1206. The slotted bracket 1206 may be secured to the rear axle using a coupler 1201. The slotted bracket 1206 allows for a bolt or other device to extend through the slotted bracket 1206. The slotted bracket 1206 may slide along the bolt or other device extending through the slotted bracket 1206.

By sliding the slotted bracket 1206, the reinforcement arm 1101 and the trimmer head 304 pivots around the axis of the coupler 1201 attaching the mounting bracket 202 to the lawnmower 101. This pivot effectively causes the trimmer head 304 to raise or lower in relation to the surface of the ground.

The rear tube 1204 may be attached to the rear adjustment bracket 1203. The rear tube 1204 may be expandingly coupled with the front tube 1205. Expandingly coupled may be defined by the rear tube 1204 and the front tube 1205 shaped and sized such that the rear tube 1204 and front tube 1205 may slide in to our out off each other respectively. For example, the front tube 1205 may be slightly larger than the rear tube 1204 such that the rear tube 1204 may slide in to the front tube 1205. As an alternative example, the rear tube 1204 and front tube 1205 may be the same in size, but shaped such that the two slide together. The fact that the front tube 1205 and the rear tube 1204 may slide allows for the combined length of the rear tube 1204 and the front tube 1205 expand or contract. As the rear adjustment bracket 1203 is slid in relation to the bolt or other device extending through the slotted bracket 1206, the rear tube 1204 and the front tube 1205 may be required to expand or contract to allow for the movement.

The tube assembly 1202 may comprise of a hollow interior that allows for electrical wires, controls, or other items to be contained with the hollow interior. For example, a wire may be routed from the motor 303 to the electrical switch 109 in part through the hollow interior of the tube assembly 1202.

Explanation of Exemplary Language

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof.

Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, devices and components, alternatives as to form, fit and function, and so on) may be described herein, such descriptions are not intended to be a complete or exhaustive list of available alternative embodiments, whether presently known or later developed.

Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

The invention claimed is:

1. An integrated trimmer device for a lawnmower comprising:
   a rear adjustment bracket secured to a rear axle of the lawnmower along a slot;
   a rear tube, the rear tube is attached to the rear adjustment bracket;
   a front tube coupled with the rear tube, the front tube is secured to a front axle of the lawnmower;
   a collar shaft affixed to the front tube;
   a mounting bracket secured to the collar shaft; and
   a trimmer mount secured to the mounting bracket at a desired rotational position about an axis along a length of the front tube, the front tube and the rear tube pivotable about an axis defined by the front axle in response to movement of the rear adjustment bracket with respect to the rear axle along the slot such that a trimmer head pivots in a plane parallel with a lawnmower wheel respect to the ground.

2. The integrated trimmer device of claim 1, wherein the front tube and the rear tube each comprises a hollow interior.

3. The integrated trimmer device of claim 1, wherein the trimmer head is mounted to the trimmer mount, the trimmer head comprises a battery powered motor and a trimmer line rotated thereby, the trimmer line at least partially shielded by a trimmer guard.

* * * * *